United States Patent [19]

Manser et al.

[11] 4,038,433

[45] July 26, 1977

[54] METHOD FOR PROCESSING SOFT VEGETABLE FOODSTUFFS INTO CRUMBS

[75] Inventors: Josef Manser, Uzwil; Friedrich Egger, Niederuzwil, both of Switzerland

[73] Assignee: Gebrueder Bühler AG, Uzwil, Switzerland

[21] Appl. No.: 664,804

[22] Filed: Mar. 8, 1976

Related U.S. Application Data

[62] Division of Ser. No. 600,112, July 29, 1975.

[51] Int. Cl.$^2$ .................. A23L 1/195; A23L 1/100
[52] U.S. Cl. .................. 426/615; 426/622; 426/640
[58] Field of Search .......... 426/615, 618, 622, 509, 426/518, 519, 522, 523, 454, 463

[56] References Cited

U.S. PATENT DOCUMENTS

| 2,439,180 | 4/1948 | McKee et al. | 426/523 |
|---|---|---|---|
| 3,251,702 | 5/1966 | Stickley et al. | 426/454 |
| 3,369,908 | 2/1968 | Gonzalez et al. | 426/622 |
| 3,700,467 | 10/1972 | Cecco | 426/615 |

*Primary Examiner*—Jeanette M. Hunter
*Attorney, Agent, or Firm*—Michael J. Striker

[57] ABSTRACT

Soft and moist vegetables are kneaded, severed and partially homogenized by a feed screw which rotates in a barrel and are admitted into a mincing unit wherein the partially homogenized material is severed by knives of a rotor which is surrounded by an apertured cylindrical stator. The comminuted material is thereupon caused to pass through the holes of an extruder and is severed behind the extruder to yield discrete crumbs which can be used as animal fodder or dried and ground to yield flour or farina, particularly flour or farina which can be used for the baking of tortillas. Vegetables which are admitted into the barrel are freshly harvested (such vegetables may include banana peels) or cooked. For example, dried grains of maize can be cooked in the presence of water and rinsed prior to admission into the barrel.

22 Claims, 8 Drawing Figures

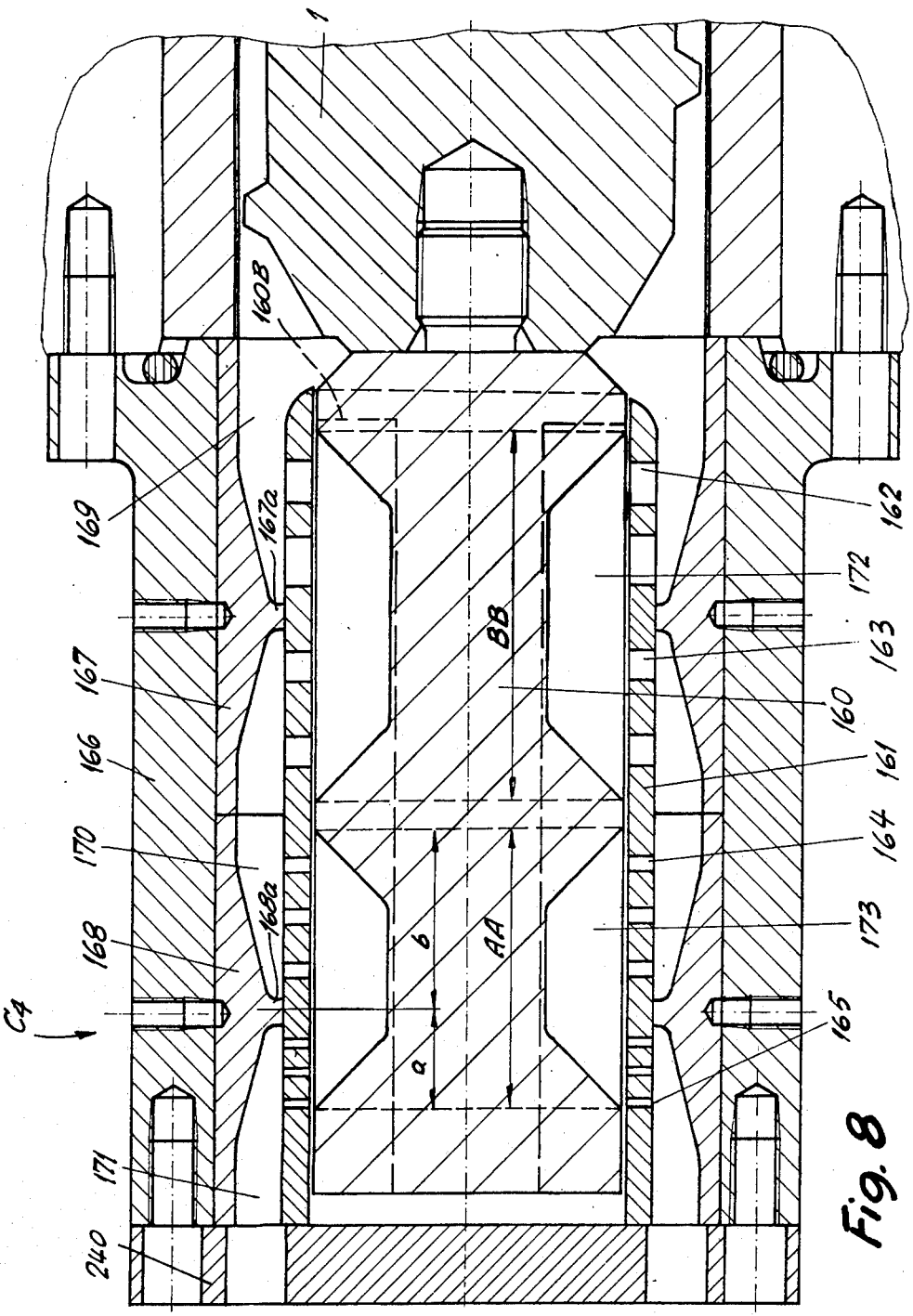

METHOD FOR PROCESSING SOFT VEGETABLE FOODSTUFFS INTO CRUMBS

This is a division of application Ser. No. 600,112, filed July 29, 1975.

BACKGROUND OF THE INVENTION

The present invention relates to a method and apparatus for processing vegetable foodstuffs, and more particularly to improvements in a method and apparatus for comminuting corn, wheat, banana peels or other types of vegetable foodstuffs which are to be consumed by humans and/or animals. Still more particularly, the invention relates to improvements in a method and apparatus for comminuting soft vegetable foodstuffs.

Many industrially processed foodstuffs of vegetable origin must be converted into a readily flowable pulverulent or similar state prior to final processing. Thus, wheat, rye and other types of grains must be treated in a mill to be converted into flour or farina prior to baking, prior to making of macaroni or analogous foodstuffs, or prior to direct sale to consumers. The making of flour for bread and/or other bakery products involves an intensive drying of grains, slight wetting and subsequent comminution in one or more passes of a flour mill. Also, many vegetable foodstuffs which are being prepared for consumption by animals are introduced (in dried condition) into a crushing mill to be comminuted to a desired degree of fineness. The thus comminuted material is thereupon compacted to form pellets. In each instance, the vegetables must be dried prior to comminution, i.e., freshly harvested vegetables are dried prior to introduction into a mill, even if the actual comminution must be preceded by a slight or pronounced increase of moisture content. Thus, at least the majority of vegetable foodstuffs must become hard (as a result of drying) before they are ready to be comminuted in a flour mill or the like.

Pronounced drying of certain types of vegetable foodstuffs prior to comminution and conversion into shapes which are expected by the consumers presents many problems. Thus, the taste, the behavior during baking or cooking, the color and/or certain other characteristics of many types of flours are less than satisfactory as a direct or indirect result of drying prior to conversion into a pulverulent or like state. Moreover, satisfactory drying of many types of vegetable foodstuffs prior to comminution takes up relatively long periods of time or such drying must be promoted by resorting to bulky, complex and expensive drying units which contribute excessively to the cost of the ultimate product. Still further, traditional mills which are used for the making of flour, farina and analogous pulverulent substances are satisfactory for comminution of cereal grains or the like but are totally unsuited for comminution of many other types of vegetables. For example, a flour mill cannot be used for conversion of freshly harvested vegetables into flour or farina, especially if the freshly harvested foodstuffs contain a high percentage of moisture. Water and other liquids squeezed out of the freshly harvested foodstuffs would immediately contaminate a flour mill and would prevent orderly evacuation of comminuted material.

Attempts to convert freshly harvested vegetables with a high moisture content into a pulverulent or like state by resorting to conventional paste mills or dough mixers have met with little success. In fact, the conversion of raw vegetables into a paste merely aggrevates the problems which arise in connection with drying before the paste can be reduced into a pulverulent or like state. Thus, a paste mill or an analogous machine can be used solely for the making of vegetable pastes; however, its use in conversion of fresh or raw vegetables into flour or farina merely contributes to the overall cost and prolongs the conversion of raw materials into a mass of flour-like consistency.

The drying of grains presents additional problems due to the fact that such foodstuffs comprise several layers, especially outer layers, which prevent rapid expulsion of moisture from the interior of the grain. Therefore, the drying of grains prior to comminution in a flour mill or the like invariably involves prolonged drying by air or expensive forced drying in specially designed ovens. It is not desirable to grind grains prior to complete or sufficient drying because the preliminary grinding must be followed by extensive drying prior to renewed grinding for the purpose of obtaining flour, farina or a substance of similar consistency. In accordance with certain presently known proposals, freshly harvested or partially dried grains are treated to form a pulpy or dough-like mass, and such mass is mixed with dry flour or farina prior to further comminution. The admixture of flour or farina to dough is necessary in order to enable a conventional mill to treat such substances for the purpose of making flour or the like. The just described recirculation of substantial quantities of flour or farina through a mill (together with a mass of pasty or like consistency) contributes significantly to the bulk and energy requirements of the apparatus.

SUMMARY OF THE INVENTION

An object of the invention is to provide a novel and improved method of converting moist freshly harvested (or moistened) vegetable foodstuffs into a form or shape which is best suited for immediate consumption or for further processing into a flowable (pulverulent or granular) state.

Another object of the invention is to provide a method of the just outlined character which can be carried out by relatively simple and compact apparatus whose energy requirements are low and which can be used for processing of several types of vegetables.

A further object of the invention is to provide a novel and improved method of making flour or farina which can be used for the baking of tortillas or analogous foodstuffs for consumption by humans.

An additional object of the invention is to provide a method of converting moist (raw or dried and subsequently wetted) vegetables into flowable products which can stand long periods of storage and which can be converted into baked products for humans consumption or animal fodder prior to or after sale to consumers or animal owners.

Still another object of the invention is to provide a novel and improved method of converting raw or moistened vegetables into porous crumbs.

A further object of the invention is to provide a novel and improved method of converting fresh banana peels into animal fodder in the form of crumbs, pellets or the like.

An additional object of the invention is to provide a simple, compact, versatile and inexpensive (especially energy-saving) apparatus for the practice of the above outlined method.

An ancillary object of the invention is to provide the improved apparatus with novel means for kneading, fragmentizing and homogenizing fresh or dried and subsequently moistened vegetable foodstuffs.

Another object of the invention is to provide the apparatus with a novel and improved unit which can comminute kneaded material to a desired size and shape.

A further object of the invention is to provide the apparatus with novel and improved means for converting kneaded, comminuted and homogenized vegetable substances into porous pellets and with novel and improved means for converting pellets into flour or farina.

One feature of the invention resides in the provision of a method of continuously processing soft and moist vegetable foodstuffs, particularly vegetables having a relatively high moisture content in the range of 20-60 percent, preferably 33-55 percent. Such vegetables may include grains of corn, wheat, rye, banana peels and/or many others. The method comprises the steps of subjecting moist vegetables to a pronounced compressing or condensing, kneading and attendant first or preliminary homogenizing action to form a mass of fragmentized vegetables (this can be achieved by conveying vegetables along one or more helical paths which are defined by the threads of a rotating feed screw and the internal surface of a cylindrical barrel for the feed screw whereby the width of each path preferably does not exceed 13 millimeters and is less than 3 millimeters and the path or paths do not occupy more than at most 25-30 percent of the interior of the barrel), comminuting the mass including subdividing the mass into a plurality of smaller batches (e.g., elongated strands) and severing the batches to form a plurality of fragments, homogenizing the thus severed and fragmentized material, and converting such material into discrete crumbs.

If the vegetables are grains of corn or maize, and if the ultimate product is to be a flowable pulverulent or granular substance (e.g., flour or farina) which can be used for the making of tortillas, the method preferably further comprises the steps of drying the crumbs and comminuting the thus dried crumbs to form a flowable pulverulent or granular product. For the making of such flour or farina, the method preferably further comprises the steps of cooking dried grains of corn in the presence of water and chalk, rinsing the thus cooked grains whereby the rinsed grains constitute the aforementioned moist vegetables which are thereupon subject to the compressing, kneading and first homogenizing action.

The steps of kneading, comminuting, homogenizing and converting the vegetables and fragments thereof are preferably carried out while the material to be treated is sealed or substantially sealed from the surrounding atmosphere, e.g., in a preferably composite housing which accommodates the aforementioned feed screw, the subdividing and severing unit, the homogenizing means (which may form part of the subdividing and severing unit), and the converting means which may include a plate-like extruder with holes for the passage of strands of homogenized material and blades which sever the strands to subdivide each strand into a plurality of porous crumbs. The communiting, homogenizing and converting steps preferably immediately follow the kneading, comminuting and homogenizing steps, respectively. The pressure which is supplied by the rotating feed screw is preferably selected in such a way that it suffices to maintain moist vegetables, the mass, the batches and the homogenized material in motion in the course of the kneading, comminuting, homogenizing and converting steps.

If the vegetables are cooked in the presence of water prior to kneading, (e.g., when such vegetables are grins of corn or maize), the kneading, comminuting, homogenizing and converting steps are preferably carried out while the vegetables and portions thereof are still hot and contain at least some of the water which is being added in the course of the cooking step.

In many instances, the material which is to be converted into crumbs can be properly homogenized only if the comminuting step comprises repeatedly subdividing the mass into batches (e.g., strands) and each subdividing step is followed by a severing step which may be carried out by resorting to one or more sets of orbiting knives. Each severing step may be followed by a discrete homogenizing step. The aforementioned knives can cut the batches of fragments into smaller fragments having maximum dimensions in the range of 1-2 millimeters. The maximum dimensions of crumbs may be in the range of 5 millimeters.

As mentioned above, the converting step may include passing homogenized material through the holes of a suitable extender and severing the strands as they issue from the holes so that each strand can yield a large number of porous and moist crumbs.

If the crumbs are to be dried and thereupon ground so as to yield a flowable pulverulent or granular product (i.e., flour or farina), the drying step may comprise heating the crumbs on an endless conveyor or heating and drying the crumbs in several stages at least one of which (e.g., the first stage) may comprise vibrating, shaking or otherwise agitating the crumbs to enhance the exchange of moisture between the material of the crumbs and the moisture withdrawing medium.

The speed of the material is preferably reduced immediately preceding the converting or crumb-forming step. This can be achieved as follows: The comminuting step may comprise conveying the mass through at least one set of apertures in a cylindrical stator and the converting step may comprise conveying homogenized material through the holes of an extruder. The speed at which the mass is conveyed through the apertures of the stator (e.g., through the last of two or more sets of apertures) is at least four times the speed at which the material passes through the holes of the extruder.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 8 is a similar longitudinal vertical sectional view of still another comminuting unit.

DESCRIPTION OF THE PREFERRED EMBODIMENTS

Figure 1:
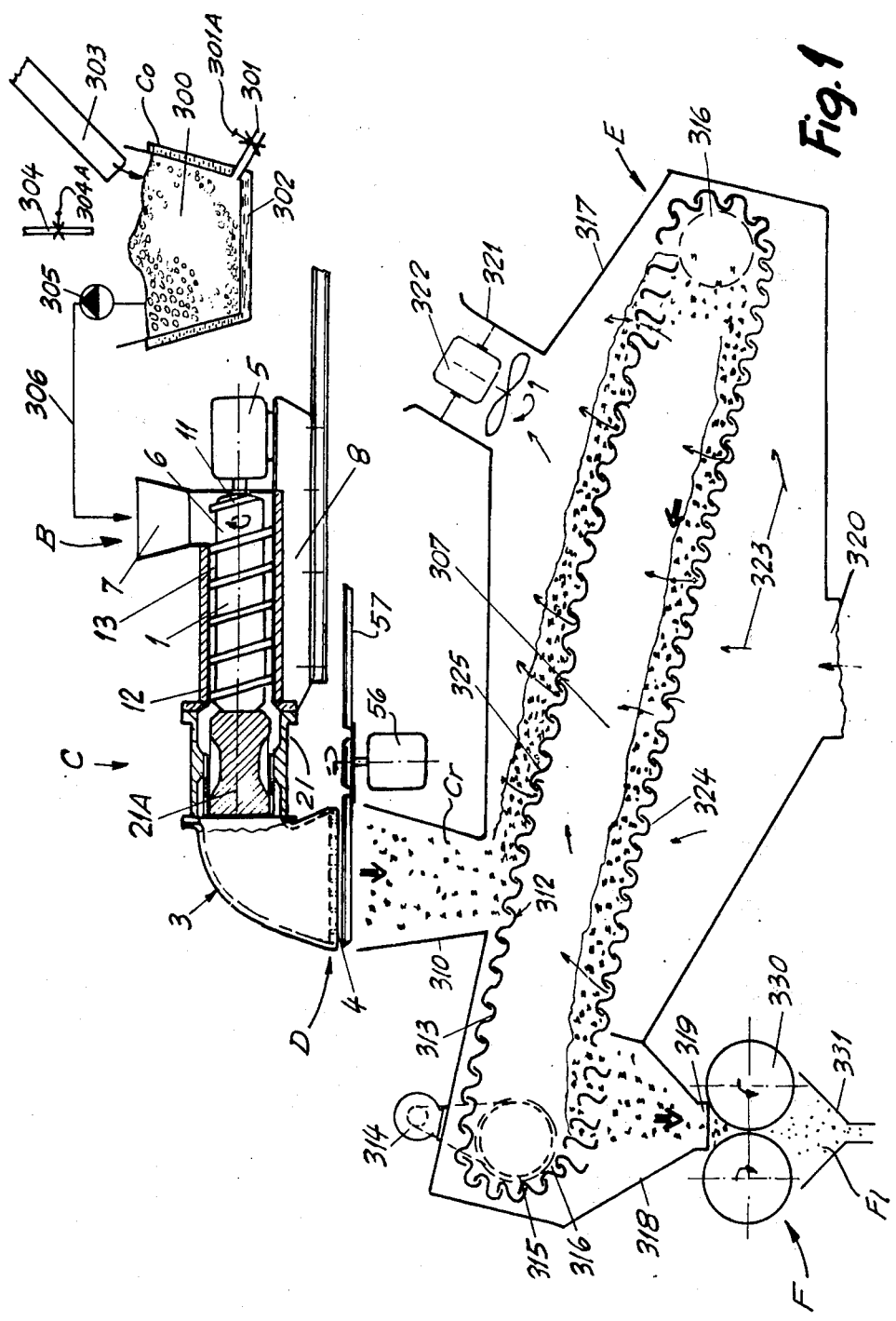
FIG. 1 is a diagrammatic partly elevational and partly vertical sectional view of an apparatus which can be used for the making of corn meal or farina such as is suited for the baking of tortillas.

Referring first to FIGS. 1, 2, 3 and 4, there is shown an apparatus which embodies one form of the invention and can be utilized to convert freshly harvested or dried vegetables (e.g., corn Co) into crumbs Cr or into a readily flowable pulervulent or granular substance F1 (which may be flour or farina). The apparatus comprises an optional preconditioning unit A (here shown as a cooker), a combined kneading, first homogenizing and first comminuting unit B, a second homogenizing and comminuting unit C, a crumb-forming unit D, a main or final conditioning unit E (here shown as a drier), and a third communiting unit or mill F.

The unit B (hereinafter called kneading unit for short) comprises a horizontal housing member or barrel 12 for a rotary feed screw 1 which is driven by a main prime mover 5 (preferably a variable-speed electric motor). The housing of the motor 5 and a heating and/or cooling jacket 14 for the barrel 12 are mounted on a suitable platform or base 8. The inlet 6 of the barrel 12 is disposed below a hopper or magazine 7 which can receive preconditioned material from the cooker A by way of a conduit 306 containing a pump 305. The pump 305 is preferably of the variable-delivery type. The feed screw 1 has a cylindrical core or shank 10 for a single or multiple helix or thread 11. The diameter Di of the core 10 is preferably only slightly less than the inner diameter of the barrel 12 so that the thread 11 defines one or more relatively narrow helical paths 13 wherein the material advances toward and into the unit C (hereinafter called mincing unit for short). Each path 13 is relatively long to insure a high satisfactory and desirable kneading with attendant homogenization as well as pronounced comminution of conveyed material. For example, the width of the helical path 13 between the internal surface of the barrel 12 and the external surface of the core 10 (as considered radially of the barrel axis 22) may be in the range of 3-13 millimeters. It is assumed that the diameter Di is or approximates 250 millimeters. The manner in which the jacket 14 may heat or cool the cylinder 12 forms no part of the invention. For example, the jacket 14 may contain one or more coils which extend longitudinally and/or circumferentially of the barrel 12 and can be connected with a source of heating or cooling fluid. The core 10 of the screw 1 is preferably hollow to allow for internal heating or cooling with a fluid. For example, that end of the feed screw 1 which is nearest to the output shaft of the motor 5 may be operatively connected with a suitable distributor or manifold which admits fresh coolant or fresh heating fluid into and receives spent coolant or spent heating fluid from the interior of the core 10.

The mincing unit C is installed in a sleeve-like intermediate housing member 15 which is secured to a flange at the left-hand end of the barrel 12 (as viewed in FIG. 1 or 2) by means of screws, bolts or analogous fasteners 16. The mincing unit C comprises a mobile comminuting means or rotor 21 which is coaxial with the feed screw 1 and is threadedly connected to the latter by means of a stub 21', stationary communiting means here shown as a hollow apertured cylindrical stator 20 which surrounds the rotor 21 with minimal clearance, and a stationary tubular guide 17 which constitutes or forms part of homogenizing means and is installed in the sleeve 15 so as to surround the stator 20. The forward end of the rotor 21 is received in a friction bearing 31 which is mounted in the smaller-diameter front end portion 20a of the stator 20. The portion 20a is located in front of a collar 20b which has an annulus of relatively large openings 20c and is urged against the adjacent end face of the guide member 17 by a cover 18 forming part of a connecting device 3 which constitutes a portion of the housing and supplies comminuted material to the crumb-forming unit D. The connecting device 3 comprises a support 9 which defines an arcuate first channel 3a for material issuing from the openings 20c of the stator 20 and a downwardly diverging second channel 3b immediately above a disk-shaped or plate-like extruder 4 of the unit D. The cover 18 is inserted into and is secured to the support 9 by bolts, screws or analogous fasteners 51. The manner in which the right-hand end of the support 9 is affixed to the sleeve 15 and/or base 8 is not specifically shown in the drawing.

The collar 20b of the stator 20 urges the right-hand end face of the guide member 17 against the flange of the barrel 12; thus, the cover 18 insures that the components 17 and 20 cannot rotate in the sleeve 15. Any, even minute, angular displacements of the guide member 17 are further prevented by one or more radial screws 45 which mesh with the sleeve 15 and whose conical tips extend into notches machined into the periphery of the guide member 17.

Figure 2:
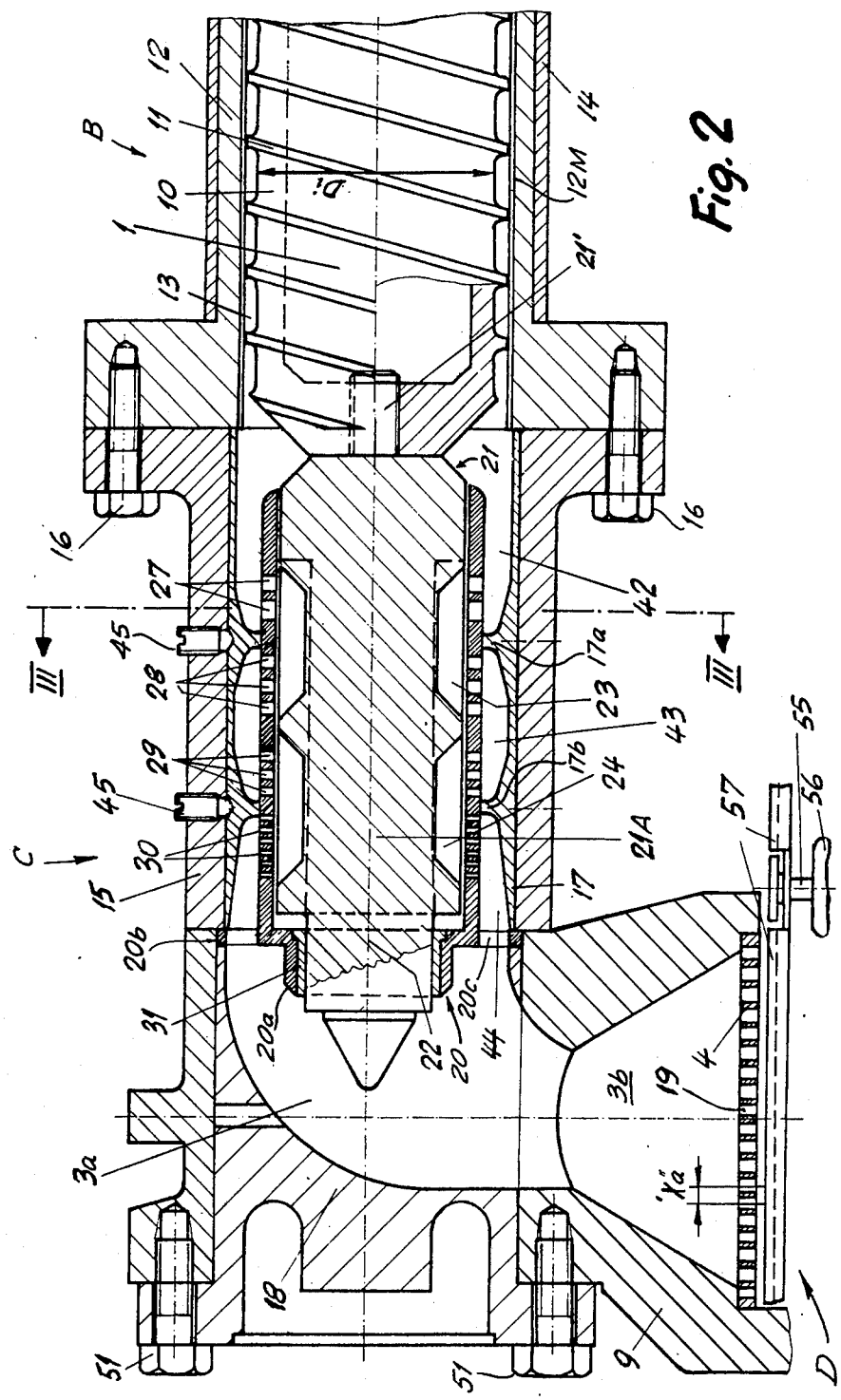
FIG. 2 is an enlarged vertical sectional view of the kneading, comminuting or mincing and crumb-forming units in the apparatus of FIG. 1.
Figure 3:
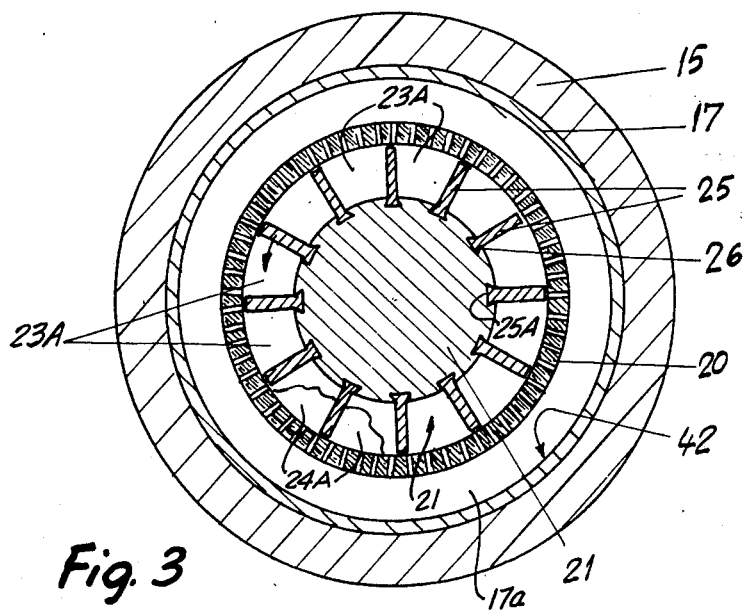
FIG. 3 is an enlarged transverse vertical sectional view of the comminuting unit, substantially as seen in the direction of arrows from the line III of FIG. 2.

The construction of the rotor 21 in the mincing unit C is shown in detail in FIGS. 2 and 3. This rotor comprises a solid cylindrical body 21A whose peripheral surface is formed with two circumferentially complete annular recesses 23, 24 having a trapezoidal cross-sectional outline (as viewed in a plane including the common axis 22 of the feed screw 1 and rotor 21). Each of the recesses 23, 24 is subdivided into several (e.g., twelve) axially parallel cells 23A, 24A, (see FIG. 3) by a set of radially arranged elongated knives 25. Each knife 25 has an enlarged (T-shaped or wedge-like) inner end portion 25a which is slidably guided in the complementary inner end portion of one of several elongated flutes 26 machined into the periphery of the cylindrical body 21A and extending in parallelism with the axis 22. The flutes 26 extend all the way to the front end face of the body 21A so that one or more knives 25 can be withdrawn from the respective flutes upon detachment of the cover 18 from support 9 and upon subsequent withdrawal of the stator 20 from the interior of the guide member 17.

If desired, the knives 25 can form integral parts of the cylindrical body 21A, i.e., this body can be treated in a suitable machine tool to be formed with discrete cells 23A and 24A. However, discrete knives 25 are preferred at this time because they can be removed for inspection, sharpening or replacement while the cylindrical body 21A remains coupled to the feed screw 1. Owing to the aforementioned trapezoidal cross-sectional outline of the recesses 23, and 24, the depth of each cell 23A, 24A increases gradually at its right-hand end and decreases gradually at its left-hand end, as viewed in FIG. 2.

The main portion of the hollow cylindrical stator 20 has a first or rearmost set of apertures 27 (see particularly FIG. 4) which are nearest to the feed screw 1, a second set of apertures 28 which are smaller than the apertures 27, a third set of apertures 29 which are preferably smaller than the apertures 28, and a fourth set of apertures 30 which are smaller than the apertures 29 and are remotest from the feed screw 1. The apertures 27, 28 and 29, 30 respectively surround the recesses 23, 24 of the cylindrical rotor body 21A. The guide member 17 has two internal (ring-shaped) partitions 17a, 17b which respectively engage the periphery of the stator 20 between the apertures 27, 28 and 29, 30. The apertures of each set of apertures in the main portion of the stator 20 may form one or more annuli; they may be staggered with respect to each other, as considered in the circumferential and/or axial direction of the rotor 21; they may be bounded by cylindrical or otherwise configurated surfaces; they may extend radially of or at an oblique angle with respect to the axis 22; and they may but need not be of identical size and/or shape. For example, the apertures 27 may include apertures having circular or polygonal outlines as well as relatively large and relatively small apertures all of which are preferably larger than the apertures 28. Also, the apertures 27 may be oval whereas the apertures 28, 39 and/or 30 are round or polygonal, or vice versa.

The guide 17 defines with the right-hand end portion of the stator 20 a ring-shaped intake 42 which receives kneaded and homogenized material from the adjacent outlet of the barrel 12 and from which the material can enter the cells 23A by passing through the apertures 27. The intake 42 terminates at the right-hand partition 17a of the guide 17. The median portion of the guide 17 (between the partitions 17a, 17b) defines with the median portion of the stator 20 a ring-shaped intermediate passage 43 which can receive material from the cells 23A via apertures 28 and can admit material to the cells 24A via apertures 29. The ring-shaped outlet 44 between the left-hand end portions of the guide 17 and stator 20 receives material from the cells 24A via apertures 30 and discharges material into the channel 3a via openings 20c in the collar 20b.

The extruder 4 of the crumb-forming unit D is removably installed in the support 9 at the lower end of the channel 3b. It has holes 19 which discharge material downwardly into a funnel 310 forming part of a housing 317 in the drier E. Strands of material issuing from the holes 19 are severed by blades 57 forming part of the unit D and being mounted on the vertical output shaft 55 of an electric motor 56. The subdivision of strands which issue from the holes 19 by the rapidly rotating blades 57 results in the formation of crumbs Cr. The motor 56 is preferably of the variable-speed type; alternatively, the output shaft 55 can drive the blades 57 through the medium of a variable-speed transmission, not shown. This motor can be mounted on the base 8 or another stationary part of the apparatus, e.g., on the housing 317 of the drier E.

As stated above, the cooker A (or another suitable preconditioning unit) constitutes an optional feature of the apparatus. The same applies for the units E and F. For example, the apparatus can be used to convert fresh (i.e. moist) banana peels into crumbs Cr which are to be consumed immediately after they issue from the unit D.

The peels (with a moisture content of 20–69 percent, preferably 35–55 percent) are fed directly into the hopper 7 of the barrel 12 by a suitable conveyor or by hand.

The motor 5 is on so that it drives the feed screw 1 and the rotor 21 at a preselected speed. The motor 56 is also started to drive the blades 57 of the crumb-forming unit D. The thread or threads 11 of the core 10 draw raw material into the helical path or paths 13 and force the material to advance toward and into the intake 42. The feed screw 1 effects a highly desirable preliminary comminution and homogenization of raw material. The feed screw 1 further insures that the material which fills the intake 42 penetrates into the cells 23A by passing through the largest apertures 27 of the stator 20, and such material is comminuted by the orbiting knives 25 of the rotor 21. The path of cutting edges at the outer ends of the knives 25 is substantially normal to the direction of material flow through the apertures 27. Since the cylindrical body 21A of the rotor 21 carries twelve equally spaced knives 25, each strand of material which passes through an aperture 27 is severed twelve times during each revolution of the feed screw 1. The material which passes through the apertures 27 is of pulpy or mashy consistency. Therefore, the pressure which is produced by the rotating feed screw 1 suffices to force the material out of the cells 23A (owing to continuous inflow of material via apertures 27) whereby the material passes through the apertures 28 and is severed again by knives 25 on its way into the intermediate passage 43. The material then penetrates into the cells 24A by flowing through the apertures 29 and is severed again by knives 25. Additional severing takes place when the material enters the outlet 44 by flowing through the apertures 30. Such material then enters the channel 3a by way of openings 20C in the collar 20b of the stator 20. When the channel 3a is full, it begins to discharge and force material into the channel 3b so that the material is compelled to pass through the holes 19 of the extruder 4 and is converted into crumbs Cr by the rapidly rotating blades 57 of the unit D.

The extent to which the material being fed into the hopper 7 of the barrel 12 will be comminuted can be determined in advance by appropriate selection of the size of apertures 27–30 in the stator 20, the cross-sectional area of the path 13, the RPM of the feed screw 1 and rotor 21, the pressure which the feedscrew 1 exerts upon the material filling the intake 42 (i.e., the speed at which the material flows through the apertures 27–30), the number of knives 25, the number of apertures 27, 28, 29 and/or 30, and the length of the barrel 12. Other parameters which determine the extent to which the material is comminuted on its way from the hopper 7 into the channel 3a include the nature of starting material (e.g., banana peels or grains or kernels of wheat, corn or the like) and the moisture content of starting material. As a rule, the comminuting action progresses during each passage of material into the interior of or from the apertured stator 20.

The energy requirements of the apparatus, when utilized for the conversion of fresh banana peels into crumbs Cr, are surprisingly low. Such low energy requirements of the apparatus are attributable, at least to a substantial degree, to the fact that it is much simpler and easier to comminute a moist or wet vegetable than a dried vegetable. It is clear that the crumbs can be thereupon dried, in one or more stages, and ground to yield banana peel flour or farina. The term "farina" is intended to denote granular products whose size exceeds that of products which are commonly known as flour. The drying can be carried out in the unit E or in an analogous drier, e.g., a drier which withdraws moisture from crumbs Cr, in two or more stages one (preferably the first) of which includes vibrating, shaking or otherwise agitating the crumbs to insure more satisfactory contact between all sides of each crumb and hot air or another moisture withdrawing medium.

The shape of the crumbs which are produced in the apparatus of the present invention can be said to resemble that of pellets of the type often used as animal fodder or that of minced or chopped meat cubes. However, the consistency of crumbs is somewhere (and often exactly) between that of a meat cube and that of a pellet of animal fodder. Thus, a meat cube normally consists of a few pieces of comminuted meat which are still sufficiently large to be readily discernible with naked eye. On the other hand, a pellet of the type often used as animal fodder often consists of an extremely large number of minute fragments whose size is equal to or approximates that of flour or farina particles and which are compacted or condensed to form a self-sustaining body known as pellet. The minute particles of a pellet cannot be readily discerned with naked eye.

The crumbs which issue from the unit D can contain relatively large fragments, e.g., fragments whose maximum dimensions range between 1-2 millimeters, normally between $1-1\frac{1}{2}$ millimeters. The fragments adhere to each other and are normally of different size and/or shape. For example, the fragments may include differently dimensioned and/or configured particles of shells or husks of grains whose moisture content is relatively high and which are partially bonded to each other by a viscous (pasty) substance. The crumbs Cr can readily accept and retain additional moisture and can readily release moisture. The crumbs issuing from the unit D are comparable to bread crumbs, earth crumbs or the like. The ability of crumbs to release substantial quantities of moisture in response to drying is important and desirable, especially if the crumbs are to be converted into flour or farina.

The consistency of certain vegetables which are treated in the units A, B, and C or in the units B and C is such that they will form discrete crumbs without resorting to a severing action. Thus, the conversion of material which fills the channel 3b into discrete crumbs can be effected, at least in some instances, without resorting to the severing means including the blades 57. Severing of material which issues from the holes 19 of the extruder 4 is desirable when the material contains a high percentage of moisture. Such severing insures that the size and/or shape of all or nearly all crumbs equals or approximates a desirable norm which is best suited for subsequent drying and grinding. Owing to the high porosity of crumbs, they can be readily relieved of surplus moisture by resorting to relatively simple and inexpensive driers, such as the drier E which comprises a single endless conveyor 312. The aforementioned multi-stage drying will be resorted to when the crumbs are very wet so that they are likely to adhere to each other. The first stage then peferably comprises agitating the crumbs in a suitable shaker or the like to effect rapid removal of such quantities of moisture which would cause the freshly formed crumbs to adhere to each other.

Referring again to FIG. 1, the cooker A comprises a suitable vessel 300 having a drain pipe 301 in or close to the bottom wall thereof. The pipe 301 contains a shutoff valve 301A. The vessel 300 has twin walls 302 defining one or more paths for the circulation of steam, hot water or another suitable heating medium. The material to be cooked, (e.g., freshly harvested corn Co) is fed by way of a supply pipe 303 (or a chute, not shown) which preferably receives material from a main magazine (not shown) through a suitable metering device. Water can be supplied by a pipe 304 containing a shutoff valve 304A. When the preconditioning of material in the vessel 300 is completed, the pump 305 is started to feed such material into the hopper 7 by way of the conduit 306.

The drier E comprises the aforementioned housing 317 with funnel 310 which receives crumbs Cr from the unit D. The housing 317 confines and supports two spaced-apart sprocket wheels 316 for the endless chain conveyor 312 which is assembled of normally interlaced S-shaped links 313. The upper reach 325 of the conveyor 312 travels below the funnel 310 to receive and entrain the crumbs Cr in a direction to the right, as viewed in FIG. 1. The lower reach 324 receives partially dried crumbs Cr immediately downstream of the right-hand sprocket wheel 316 and delivers dried crumbs to a funnel 318 having a discharge opening 319 above the rolls 330 of the mill F. The rolls 330 convert dried crumbs Cr into flour or farina Fl which descends into a collecting funnel 331.

The left-hand sprocket wheel 316 is driven by a coaxial pulley or sprocket wheel 315 which receives motion from the output element of a discrete electric motor 314 (preferably a variable-speed motor) mounted on the housing 317. The links 313 of the upper reach 325 are caused to pivot immediately upstream of the right-hand sprocket wheel 316 to discharge partially dried crumbs Cr onto the lower reach 324, and the links 313 of the lower reach 324 are caused to pivot immediately upstream of the left-hand sprocket wheel 316 to discharge dried crumbs Cr into the funnel 318. Conveyors using such or similar types of links are known in the art of food processing. The major part of the upper reach 325 forms a relatively wide air-permeable band which transports a layer of crumbs toward the right-hand sprocket wheel 316, and the major part of the lower reach 324 forms a similar air-permeable band which transports a layer of crumbs toward the funnel 318. Heated air is admitted into the lower portion of the housing 317 (below the lower reach 324) by way of a duct 320, and spent air is evacuated from the upper portion of the housing 317 (above the upper reach 325) by a suction fan 322 mounted in a duct 321. The arrows 323 indicate the direction of flow of hot air currents through the lower reach 324 of the conveyor 312, through the space 307 between the reaches 324, 325, through the upper reach 325, and toward and into the duct 321. Each link 313 which approaches the right-hand or left-hand sprocket wheel 316 is temporarily tilted or pivoted by a suitable cam or the like, not shown, so that the thus tilted links then form a number of gaps through which the crumbs respectively descend from the upper reach 325 onto the lower reach 324 and from the lower reach 324 into the funnel 318.

The means for rotating the rolls 330 of the mill F is not shown in the drawing. It is clear that the mill F may comprise two or more passes of comminuting rolls.

The exact design of the cooker A, drier E and/or mill F will depend on a number of factors, such as the nature of material to be treated, the extent to which the moisture content of crumbs should be reduced prior to grinding, the desired output per unit time, the fineness of the final product and/or others.

In its simplest form, the unit C may comprise a device similar to a meat grinder wherein a stationary apertured disk is adjacent to one or more rotary cutters which sever strands of material passing through the apertures or sever the material in front of the disk. However, a hollow cylindrical stator with a rotor therein is preferred in most instances, especially since the material to be severed by the knives of the rotor can be caused to repeatedly enter into and issue from the stator. Moreover, the wear upon a hollow cylindrical stator and upon a rotor which is at least partially confined in the stator is much less pronounced than the wear upon the stationary and mobile cutting parts in a conventional meat grinder. A hollow cylindrical stator and/or a rotor in such stator is not subjected to excessive axial stresses; in addition, all radial stresses are equally distributed along the circumference of the stator, i.e., such radial stresses normally balance or neutralize each other. The number of knives is normally between 10 and 15; however, it is equally possible to operate with fewer knives (e.g., eight) or more than 15 knives. A large number of relatively small knives can be accommodated in a small area. A hollow cylindrical stator is preferred on the additional ground that it allows for repeated homogenization of material subsequent to each pass across the path of the orbiting knives. A substantial part of the homogenization takes place in the ring-shaped inlet, intermediate passage and outlet between the stator and the guide member.

If the ultimate product F1 is flour or farina which is to be used for the baking of tortillas, the apparatus of FIG. 1 is operated as follows:

Dried grains of corn (maize) are admitted into the vessel 300 with a customary amount of lime and water, and are cooked for about 50 minutes, normally less than 60 minutes. During cooking, the mass of corn should be constantly covered with water, i.e., the upper surface of the body of water in the vessel 300 should not be below the level of the upper stratum of corn. After cooking for 50 minutes, the valve 304A is opened so that the pipe 304 admits a metered quantity of water, preferably about 1/4-liter per kilogram of corn. The mass is thereupon stirred and the valve 301A is opened to allow for evacuation of that quantity of water which has been admitted via pipe 304. The admission of water via pipe 301, stirring of the mass subsequent to such admission, and the evacuation of thus admitted water via pipe 301 results in desirable rinsing of corn. However, the rinsing could not be too pronounced in order to avoid the evacuation of excessive quantities of viscous or slimy \* E.G. 8,35g. LIME WITH A CONTENT OF 62% Ca0 FOR 1000g OF CORN. ingredients which consist primarily of chalk.

The freshly cooked and rinsed but still quite hot mass is thereupon fed into the hopper 7 by the pump 305, preferably while the mass contains 40-60 percent, more preferably in excess of 50 percent and most preferably about 52-54 percent of moisture. In accordance with a highly advantageous feature of the method, the grains of corn Co which are admitted into the barrel 12 via hopper 7 undergo a very intensive kneading action. The internal surface of the barrel 12 is preferably provided with shallow longitudinally extending grooves 12M (shown in FIG. 2) which enable the feed screw 1 to advance the mass toward the unit C. Moreover, the internally grooved barrel 12 cooperates with the threads 11 to effect a highly satisfactory, pronounced and desirable comminution or fragmentizing of corn Co. Also, the just discussed pressing, fragmentizing and kneading results in pronounced initial or preliminary homogenization of cooking particles. The length of the barrel 12 should be sufficient to insure that the rotating feed screw 1 will produce a pressure of several kilograms per square centimeter. The width of the path 13 is assumed to be 3-13 millimeters (as considered in the radial direction of the barrel 12). The aforementioned pressure is desirable in order to insure intimate mixing of chalk-containing viscous substances with fragments of corn whereby the viscous substances react with or otherwise affect the condition of the fragments. The mixing of chalk with fragments of corn in the barrel 12 is desirable because this is the most satisfactory locus for homogenization (i.e., for uniform distribution of chalk in the mass of comminuted corn). In other words, if the viscous substances are not intimately mixed with and uniformly distributed among the fragments of corn during travel along the path or paths 13, the ultimate product F1 is unlikely to contain corn and chalk in uniform distribution.

It has been found that the taste of tortilla flour is much less satisfactory if the treatment in the unit B is omitted or replaced with a different treatment. Thus, and assuming that, instead of being kneaded, homogenized, compressed and comminuted, cooked corn Co which as been removed from the vessel 300 is comminuted in a different way, the taste of flour which is obtained by thereupon conveying the conventionally comminuted grains of cooked corn through the units C-F of the apparatus of FIG. 1 will be much less satisfactory than if the unit C receives comminuted, homogenized and kneaded material from the unit B.

The mass which issues from the barrel 12 is thereupon treated in the same way as described above in connection with the making of crumbs from banana peels, and the crumbs are introduced into the drier E. The mincing unit C can be modified and/or simplified in a manner to be described in connection with FIGS. 5-8; however, in each instance, the mincing unit preferably causes the material to undergo at least two severing actions, i.e., the rotor of the mincing unit should have at least two sets of apertures the first of which enables strands of material to enter a set of cells and the other of which allows strands of material to issue from the cells whereby the strands are severed during entry into as well as during flow out of the cells.

It is further desirable to bring about a pronounced homogenization subsequent to each severing step. With reference to FIGS. 1-4, this means that the body 21A of the rotor 21 should have relatively large cells 23A, that the guide member 17 and the stator 20 should define a relatively large passage 43, that the body 21A should have relatively large cells 24A, and that the member 17 should define with the stator 20 a relatively large outlet 44. Thus, ample room should be provided for mixing of fragments of corn subsequent to each severing by the knives 25. Homogenization of material during severing by the knives 25 is further enhanced by providing the stator 20 with relatively large apertures. Highly satisfactory results can be obtained if the stator has at least three sets of apertures including largest apertures with a diameter of approximately 5 millimeters, medium-sized apertures with a diameter of about 3 millimeters, and smallest apertures with a diameter of about 2 millimeters. The diameters of the crumbs Cr are preferably in the range of 5 millimeters. If the crumbs are short cylinders, their length preferably equals or approximates their diameter.

The drier E (or another suitable drier) is preferably designed to reduce the moisture content of crumbs Cr from 52-54 percent to about 10 percent within a period of 20-120 minutes. The conversion of dried crumbs into flour or farina F1 can be effected by resorting to a customary flour mill, to ball mills or other impact-type mills which are capable of reducing the crumbs to a desired degree of fineness.

Flour or farina F1 which issues from the unit F can be used for the baking of tortillas or similar products whose quality matches or exceeds that of tortillas made on a small scale in accordance with traditional procedures. This is achieved by converting corn Co and customary additives first into crumbs Cr, by thereupon drying the crumbs, and by thereupon comminuting the crumbs in the unit F of FIG. 1 or in an analogous unit. The making of flour or farina may be continuous or intermittent.

The unit A can be omitted in its entirety if the feed screw 1 is long enough to insure heating to boiling or cooking temperature during travel of corn from the hopper 7 into the unit C. Also, the cooking of corn can be effected partly in the vessel 300 and partly in the barrel 12.

Flour or farina which is obtained from corn Co is mixed with water and formed into thin round cakes having a diameter of 10-15 centimeters. Such cakes are thereupon baked and consumed without any additives, converted into cones and filled with meat, sauces or the like, dipped into one or more sauces, or coated with one or more sauces or the like. Tortillas or enchiladas are consumed in many Latin American countries instead of bread. An acceptable tortilla must exhibit a characteristic taste and color. Furthermore, it must be readily shaped without breaking or tearing. Moreover, flour or farina which is used for the making of satisfactory tortillas must be capable of taking up substantial quantities of moisture.

Heretofore known attempts to mass-produce tortilla flour or farina from dried corn have failed because the product did not exhibit the afore-discussed desirable characteristics which are expected by consumers of such exotic foods. It was already proposed to cook or boil dried corn grains in the presence of water and chalk. The thus obtained product is thereupon rinsed and immediately introduced into an impact type mill together with a quantity of dried corn because an impact mill cannot comminute a highly viscous substance of pasty or like consistency. The material which issues from the impact mill is thereupon treated in a thermopneumatic drier, subjected to a renewed grinding or comminuting action, and ultimately sifted. Such method can be resorted to for the making of reasonably acceptable tortilla flours; however, it is not sufficiently economical to allow for the making of tortilla flour or farina at a cost which is sufficiently low to warrant its use in developing countries of Latin America and elsewhere. Furthermore, the wear upon component parts of the apparatus for the practice of such conventional method is very high, and this is attributable largely to the fact that cooked material must be mixed with dry corn prior to admission into and treatment in the impact mill. Extremely large quantities of heat energy are necessary for repeated drying of the product, namely for drying of material which is to be cooked, for drying the material which is to be added to cooked material prior to admission into the mill, and for drying of material which is discharged from the mill. Still further, even though the flour or farina which can be obtained in accordance with the just discussed method is acceptable, its quality is invariably inferior to that of flour or farina which is being produced in Mexico and other Latin American countries in accordance with traditional (small scale) procedure which the children learn from their parents. Such traditional procedures involve kneading of cooked corn, i.e., a step which is lacking in the aforediscussed conventional method.

Experiments with farina or flour which is produced in accordance with our method and by resorting to apparatus of the type shown in FIGS. 1-4 have produced results which surpassed the most optimistic expectations. Thus, tortillas made from such flour or farina are of surprisingly high quality, especially as regards their taste and appearance. Moreover, the method is economical because it does not involve recirculation of any vegetables so that the output of the apparatus is high and its energy requirements low. The apparatus can be used for continuous production of crumbs and/or flour or farina, especially if the unit A comprises two or more vessels so that the contents of one vessel are being transferred into the hopper 7 while the material filling the other vessel or vessels is being cooked, and vice versa.

The treatment of grains or the like in the unit B constitutes a very important and advantageous step of the improved method of making crums Cr or a flowable mass of smaller particles F1. Thus, the kneading of grains in the barrel 12 causes release of a relatively small percentage of liquid and viscous substances simultaneously with comminution of cellular parts, such as husks or shells and kernels whereby the comminuted cellular parts form a composite mass whose consistency is basically different from that of starting materials. Thus, the mass is much looser than the coherent portions of a moist grain or the like.

The apparatus of the present invention preferably seals the material or materials to be treated from the surrounding atmosphere, at least during travel of materials from the hopper 7 to the drier E. The force (pressure) which is needed to maintain the foodstuffs in motion during travel from the hopper 7 to the inlet of the drier E is preferably supplied exclusively by the rotating feed screw of the unit B.

Many types of vegetable foodstuffs can be processed in apparatus wherein the feed screw 1 produces a static pressure in the range of from a fraction of one kilogram to a few kilograms per square centimeter. The static pressure which is best suited for treatment in the unit B depends also on the desired degree of comminution of a particular foodstuff and on intended use and size of the ultimate product (i.e., crumbs, flour or farina). It has been found that quite a few foodstuffs can be treated by resorting to extremely low static pressures. On the other hand, many foodstuffs must be processed at pressures of 20, 30 and more kilograms per square centimeter. This necessitates the utilization of a relatively large and long feed screw. The feed screw of the unit B is different from and superior to the feed screws of conventional meat grinding machines which produce a minimum of or no kneading action at all, which cannot establish and maintain relatively high static pressures, and wherein the material which is being comminuted (or is about to be comminuted) is fed through relatively short distances in a small number of channels or paths having large cross-sectional areas.

If a particular foodstuff must undergo a very pronounced homogenizing action prior to entry into the mincing unit C, the unit B will preferably employ a feed screw whose core has a very large diameter, as compared with the internal diameter of the barrel. This guarantees that the parts 1 and 12 will define one or more narrow paths wherein the material is not only comminuted and homogenized but is also subjected to very high pressures which insure that the material will pass through relatively large as well as through relatively and extremely small apertures of the stator 20.

The apparatus of FIG. 1 can be used with advantage for processing of foodstuffs which must undergo a very pronounced comminuting as well as a very intensive homogenizing action, i.e., of foodstuffs which cannot be homogenized to a desired extent exclusively during travel in the path or paths defined by the barrel 12 and feed screw 1. Thus, additional and very pronounced homogenization must take place in the mincing unit C which is designed to insure thorough intermixing of all ingredients simultaneously with an equally thorough comminuting action. The extent of homogenization and the extent of comminution in the mincing unit C will depend on the number of times the material is being extruded through the apertures of the stator 20 and severed by the knives 25 of the rotor 21. Such repeated and frequent severing and honogenizing insures intimate intermixture of pulpy or similar substances with water, other additives (such as chalk) and solid particulate material. As mentioned above, additional homogenization is effected as a result of repeated accumulation of material in ring-shaped spaces including the intake 42, passage 43, outlet 44, recess 23 and recess 24. Thus, as the material which fills the intake 42 enters the cells 23A of the recess 23, it is subdivided into a very large number of strands which are forced to flow through the apertures 27 and are severed, at very frequent intervals, by the rapidly orbiting knives 25 of the rotor 21. The thus formed and severed strands accumulate in the respective cells 23A to form batches of thoroughly intermixed ingredients, and such batches are thereupon extruded through the apertures 28 with simultaneous repeated severing by the knives 25. the repeatedly severed strands which enter the passage 43 accumulate into a batch of homogeneous ingredients, and such batch is extruded into the cells 24A with simultaneous frequent severing, and so on. Consequently, the mass which fills the channel 3b consists of intimately intermixed ingredients. The homogenizing action of the mincing unit C is further enhanced by repeated changes in the direction of material flow on its way from the path or paths 13 into the channel 3b. Such material flows in part axially, inpart circumferentially and in part radially inwardly or outwardly of the rotor 21 whereby its ingredients undergo additional desirable and thorough homogenizing action. Still further homogenization takes place when the material which accumulates in the outlet 44 flows through the openings 20c, is thereupon deflected by the channel 3a, accumulates in the channel 3b, and passes through the holes 19.

For proper treatment of a majority of foodstuffs, the diameters Xa of holes 19 in the extruder 4 should at least equal but preferably exceed the diameters of smallest apertures in the stator 20 (it being assumed that the holes 19 and apertures 30 are circular). However, this does not mean that each crumb Cr consists of, say, two or four discrete parts or fragments. The diameters of apertures in the stator 20 establish purely theoretical standards for the dimensions of largest fragments or particles which enter the channel 3a. As a rule, the major part of each piece of foodstuff (e.g., a grain or peel) is subdivided into fragments whose maximum dimensions are much less than the maximum dimensions of apertures in the stator. This is due to the fact that the maximum dimensions of fragments are also influenced by the RPM of the rotor 21, the number of knives 25 and/or the velocity at which the material passes through the apertures of the stator. It is presently preferred to design the units C and D in such a way that the combined cross-sectional area of the last set of apertures (30) in the stator is less than the combined cross-sectional area of holes 19 in the extruder 4. Such design is of particular importance in connection with the processing of all such vegetable foodstuffs which, prior to treatment in the unit A or B, do not exhibit a pronounced porosity. Otherwise, the crumbs Cr which are formed by severing the strands passing through the holes 19 would resemble pellets of the type used as animal fodder or fragments of pasty threads.

As a rule, the combined cross-sectional area of holes in the extruder will be at least twice, and preferably at least four times, the combined cross-sectional area of the set of smallest holes in the stator of the mincing unit. This insures that the maximum dimensions of fragments in the material filling the channel 3b do not exceed the radius of a hole 19. It is further preferred to greatly reduce the speed of forward movement of material immediately or shortly ahead of the unit D. Thus, the speed at which strands of comminuted material pass through the last set of apertures 30 in the stator 20 should be a small fraction of the speed at which the strands pass through the holes 19 of the extruder 4. The area of the extruder 4 is preferably several times (most preferably at least four times) the cross-sectional area of the feed screw 1.

If the starting material is heated (e.g., in the vessel 300 of the unit A), it is preferred to convey the material through the units B, C and D while the material and/or its fragments are still hot.

The distribution of holes 19 in the extruder 4 is preferably selected with a view to insure that the strands of homogenized material descending below the extruder 4 into the range of orbiting blades 57 are sufficiently spaced from each other, i.e., that the freshly formed crumbs Cr cannot or are not likely to contact each other. In many instances (especially if the material passing through the extruder 4 contains a very high percentage of moisture), the distance between the centers of neighboring holes 19 will be two, three or more times the diameter of a hole.

The provision of a unit B which repeatedly subdivides the material coming from the barrel 12 into batches or strands and repeatedly severs such batches or strands is often desirable and advantageous because the composition of ultimate products (Cr or Pl) is more predictable and also because the vegetables are less likely to be shredded or otherwise comminuted in a random fashion. In many instances, if suffices if the transport through the last set of apertures in the stator results in comminution of vegetables into fragments having maximum dimensions in the range of 1-2 millimeters; however, the majority of fragments will be much smaller. Such fragments can be homogenized and converted into satisfactory crums by passing through holes 19 having a diameter of up to 5 millimeters, preferably between 2 and 5 millimeters.

In each or nearly each instance, the crumbs Cr should have a highly porous texture, i.e., they should consist of loosely joined fragments with a large number of interstices, cavities or the like to facilitate rapid and uniform drying in the unit E or an analogous unit. Such loose and porous texture is practically assured if the combined area of all holes 19 exceeds the combined area of all apertures 30, even if the starting material exhibits negligible porosity. The porosity of crumbs Cr is further enhanced dur to the fact that each crumb consists of several fragments having widely different sizes and/or shapes so that they cannot and are not compacted or assembled into a substantially solid body or mass. The pressure in the channels 3a and 3b need not and preferably is not very high; this insures that the just discussed fragments are not compressed to form solid or practically solid strands which would yield pellets or pasty cylinders rather than porous crumbs.

The apparatus can be used for immediate processing of freshly harvested or collected vegetable foodstuffs or for processing of foodstuff which have undergone a pronounced drying or moisture-expelling action and must be subjected to a preliminary treatment (such as cooking in the vessel 300) before they assume a consistency which is best suited for introduction into and kneading as well as other treatment in the unit B. In many instances (or in a majority of instances), the crumbs Cr constitute intermediate products, i.e., they are thereupon relieved of excess moisture prior to undergoing a further comminuting action in the unit F or a similar unit. Relatively wet crumbs can be used in certain instances as animal fodder. The making of tortilla flour or farina from corn in an extremely simple, time-saving and economical manner constitutes one of the presently preferred uses of the improved method and apparatus.

Figure 5:
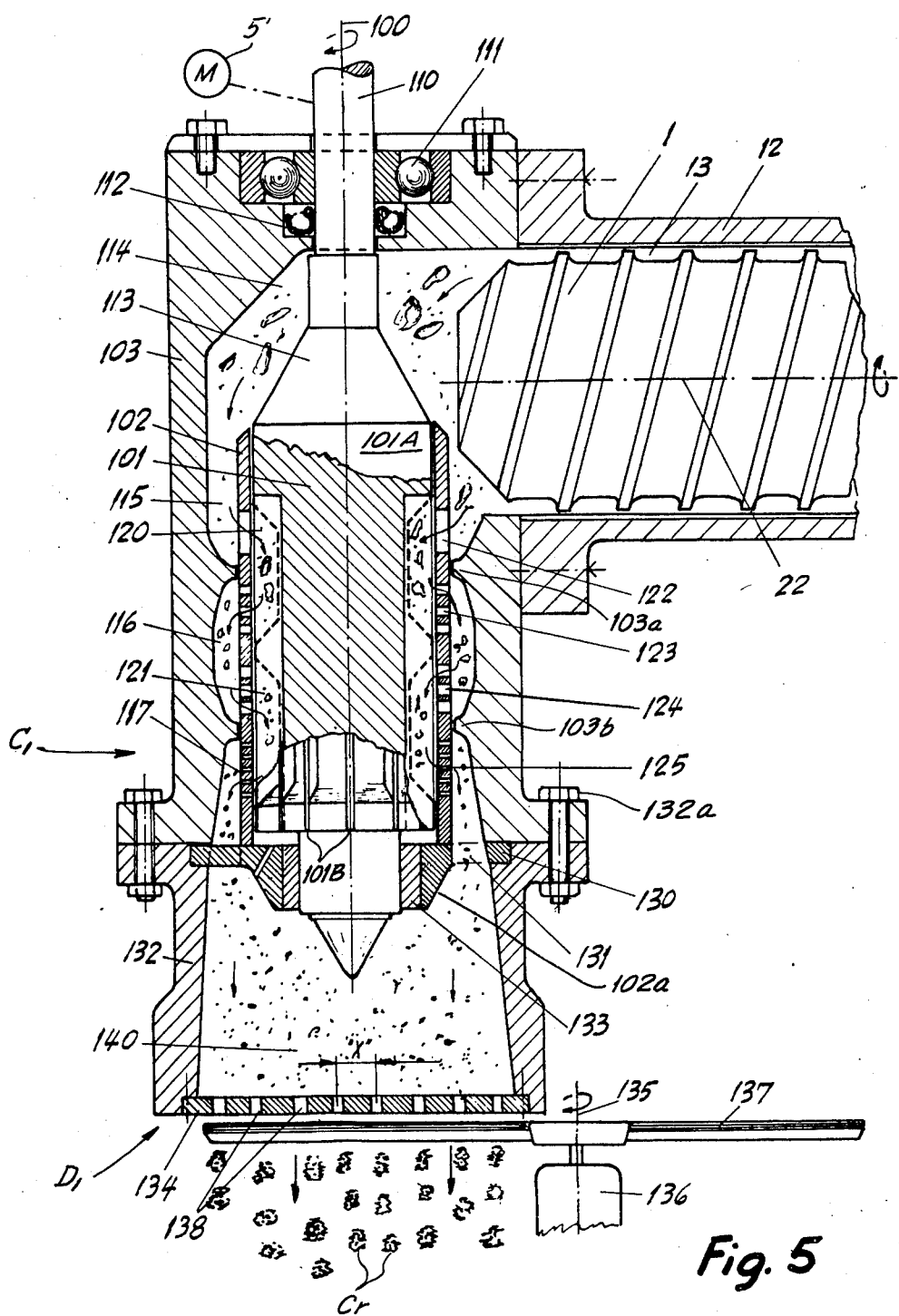
FIG. 5 is a longitudinal vertical sectional view of a portion of a modified apparatus which comprises an upright comminuting unit.

FIG. 5 shows a modified mincing unit $C_1$ which receives partially homogenized material from a kneading unit similar to or identical with the unit B of FIGS. 1-2, FIG. 5 merely shows the feed screw 1, the barrel 12 and a helical path 13. The axis 22 of the feed screw 1 is normal to and intersects the vertical axis 100 of a rotor 101 forming part of the mincing unit $C_1$. The rotor 101 is mounted in a hollow apertured cylindrical stator 102 which is surrounded by a stationary tubular guide member 103. The rotor 101 is driven by a separate prime mover 5' which transmits torque to the upwardly extending shaft 110 of the rotor. The shaft 110 extends upwardly from and beyond the guide member 103 and is mounted in an antifriction roller bearing 111. The inner race of the bearing 111 is disposed above a ring-shaped seal 112 for the shaft 110 which prevents liquids and/or comminuted solid matter from escaping into and beyond the bearing. The prime mover 5' is preferably a variable-speed electric motor or a constant-speed motor combined with a variable-speed transmission. The rotor 101 further comprises a solid cylindrical body 101A which is connected with the shaft 110 by a conical intermediate portion 113.

The upper end portion of the guide member 103 is bolted or otherwise sealingly secured to a flange of the barrel 12 and defines a suitably configurated channel 114 which guides the material issuing from the kneading unit into a ring-shaped intake 115 surrounding the upper end portion of the stator 102. The configuration of the channel 114 is preferably such that the guide member 103 does not exhibit any dead corners for accumulation of material which is to be conveyed into the crum-forming unit $D_1$. The guide member 103 has two internal ring-shaped partitions 103a, 103b, which sealingly engage the adjacent portions of the peripheral surface of the stator 102. The partition 103a separates the intake 105 from a ring-shaped intermediate passage 116, and the partition 103b separates the passage 116 from a ring-shaped outlet 117. The body 101A of the rotor 101 has an upper annular recess 120 and a lower annular 121. These recesses are subdivided into annuli of cells by vertical knives 101B which are mounted in the body 101A in a manner similar to or identical with that described in connection with the knives 25 of FIG. 3.

The main portion of the stator 102 has an uppermost set of relatively large apertures 122 which admit material from the intake 115 into the cells of the recess 120, a set of smaller apertures 123 which admit material from the cells of the recess 120 into the passage 116, a set of apertures 124 which may be equal to or smaller than the apertures 123 and admit material from the passage 116 into the cells of the recess 121, and a set of smallest apertures 125 which admit material from the cells of the recess 121 into the outlet 117. The lower end portion 102a of the stator 102 has a collar 130 with openings 131 which allow material to flow from the outlet 117 into a channel 140 defined by a diffusor-like upright support 132 for the plate like or disk-shaped extruder 134 of the unit $D_1$. The end portion 102a receives a friction bearing or sleeve bearing 133 for the lower end portion of the rotor 101. The upper end portion of the support 132 is sealingly secured to a flange at the lower end of the guide member 103 by bolts and nuts 132a of analogous fastener means.

The extruder 134 is removably mounted in the lower end portion of the support 132 by means of screws or the like, not shown, and has holes 138. The distance X between the centers of neighboring holes 138 is greater than the distance Xa between the centers of neighboring holes 19 in the extruder 4 of FIG. 2. The manner in which the extruder 4 or 134 is separably affixed to the respective support may but need not be the same as known from conventional household meat grinders.

The underside of the extruder 134 is located immediately above the path of orbiting blades 137 on the output shaft of a discrete motor 136 having a vertical axis 135. The blades 137 sever the material issuing from the holes 138 to form crumbs Cr. For example, the output shaft of the motor 136 can carry three equally spaced blades 137.

The operation of apparatus which embodies the units $C_1$ and $D_1$ of FIG. 3 is analogous to that of the apparatus shown in FIGS. 1-4. Thus, kneaded and homogenized material which issues from the helical path or paths 13 fills the channels 114 and intake 115 to be forced into the cells of the recess 120 by way of the apertures 122 whereby the strands of material passing through the apertures 122 are severed by the knives 101B on the rapidly rotating body 101A. The knives 101B sever the material again during travel through the apertures 123 (into the passage 116), during travel through the apertures 124 (into the cells of the recess 121) and during travel through the apertures 125 (into the outlet 117).

The diameter of the channel 140 in the support 132 increases in a direction from the outlet 117 toward the extruder 134. The upper end of the channel 140 receives material from the outlet 117 through the openings 130a of the collar 130. The diameters of the holes 138 greatly exceed the diameters of lowermost apertures 125 in the main portion of the stator 102 (this also applies for the apertures 30 and holes 19 shown in FIG. 2). If desired, the extruder 4 or 134 may be a rectangular plate with two shorter sides (as considered in a direction from the left to the right in FIG. 2 or 5) and two longer sides (as considered at right angles to the plane of FIG. 2 or 5). The dimensions of the extruder will be selected with a view to insure an optimum formation of crumbs $Cr$.

An important advantage of the mincing unit $C_1$ is that the speed of the rotor 101 can be selected and regulated independently of the speed of the feed screw 1, or vice versa. Also, the apparatus occupies less floor space because the axis 100 is vertical. The superior versatility of the mincing unit $C_1$ and greater compactness of the apparatus embodying this mincing unit more than compensate for the cost and energy requirement of the prime mover 5'.

The unit $C_1$ can be used with advantage when the moisture content of vegetables is very high. The unit D or $D_1$ is preferably designed to discharge crumbs downwardly, irrespective of whether the axis of the rotor in the preceding unit C or $C_1$ is horizontal or vertical; such orientation of the unit D and $D_1$ is especially advantageous when the vegetables have a high moisture content because the crumbs which are formed below the extruder 4 or 134 are less likely to contact each other immediately after severing of corresponding strands by the orbiting blades 57 or 137.

The provision of a separate prime mover (5') for the rotor of the mincing unit is particularly advantageous and desirable if the apparatus using such mincing unit is to be used for processing of a wide variety of vegetable foodstuffs.

Those apertures of the stator in the unit C or $C_1$ which admit material into the interior of the stator are preferably larger than the apertures which allow material to pass from the interior of the stator into the passage or outlet between the stator and the guide member. This insures that the resistance which the material offers to flow into and out of the stator is relatively low, i.e., the feed screw 1 can be made shorter because it need not produce a high pressure. In many instances, the width of the path or paths 13 should not exceed 10 millimeters and should not be less than 3 millimeters, and the entire path or paths should not take up more than 30 percent of the interior of the barrel, preferably not more than 25 percent. Such dimensioning of the feed screw and barrel insures that the unit B produces a pronounced kneading action.

Figure 6:
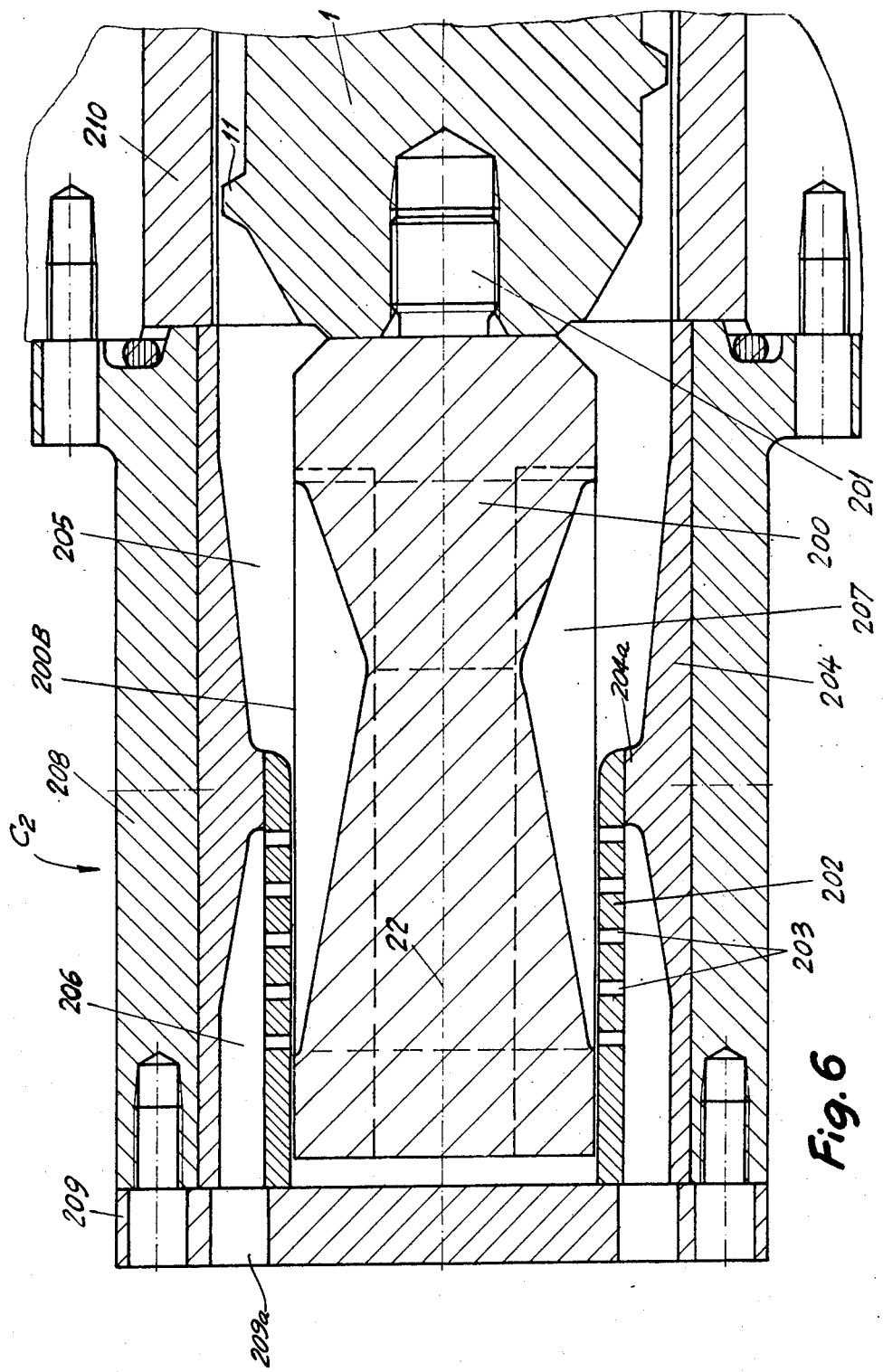
FIG. 6 is a longitudinal vertical sectional view of a simplified comminuting unit.

FIG. 6 shows a simplified mincing unit $C_2$. The rotor 200 has a threaded stub 201 in a tapped bore of the feed screw 1, and its peripheral surface is formed with a single annular recess 207. The stator 202 is a relatively short cylinder which surrounds approximately one-half of the rotor 200 and has a single set of apertures 203. The tubular guide member 204 is mounted in a sleeve 208 which is secured to a barrel 210 for the feed screw 1. The knives 200B subdivide the recess 207 into an annulus of cells whose outer sides are open so that they can receive material from the ring-shaped intake 205 and can discharge material into a ring-shaped outlet 206 whereby such material passes through the apertures 203 and is severed by the knives 200B. The guide member 204 has a single ring-shaped partition 204a which engages the periphery of the right-hand end portion of the stator 202. The partition 204a prevents direct flow of material from the intake 205 into the outlet 206, i.e., the material must flow through the cells of the recess 207 and through the apertures 203. The depth of each cell increases in a direction from the feed screw 1 toward the nearest end of the stator 202 and decreases toward the left-hand end of the rotor 200.

The left-hand end of the sleeve 208 is connected with a plate-like holder 209 which performs the function of the collar 20b or 130 and has openings 209a for admission of material from the outlet 206 into a channel immediately upstream of the extruder, not shown. The stator 202 is rigid with the holder 209 and/or guide member 204, and the latter abuts against the left-hand end of the barrel 210.

Apparatus which embody mincing units of the type shown in FIG. 6 are especially suited for processing of elongated and/or fibrous vegetables, such as fresh and hence moist banana peels. The peels are subjected to an intensive comminuting action in the interior of the barrel 210, and the comminuting action is completed during travel from the intake 205 into the outlet 206. Since the peels are elongated, the thread or threads 11 can force them into the intake 205 without resorting to elevated pressures, and the apertures 203 convey large quantities of comminuted peels into the outlet 206 whereby the material passing through the apertures 203 is subjected to repeated severing action of the knives 200B.

The unit $C_2$ is suited for comminution of relatively tough vegetable foodstuffs, e.g., such as the aforementioned foodstuffs having an elongated shape and longitudinally extending fibres. These foodstuffs can enter the interior of the stator 202 without passing through a set of apertures, i.e., they are severed by knives 200B only while they pass from the interior of the stator into the outlet 206. The feature that the recess or recesses of the rotor in the mincing unit are deepest in the central regions and shallower at the receiving and discharging ends thereof is desirable and advantageous because such design reduces the resistance which the material offers to the flow into and from the respective cells; this, in turn, insures that the apparatus can operate with a relatively short feed screw. Moreover, the severing action is more uniform if the material offers a predictable resistance to flow into and from the cells of the rotor. Still further, such design of the recess or recesses in the rotor insures a desirable self-cleaning action, at least while the apparatus in in use. Also, the likelihood of formation of dead corners is reduced or eliminated so that each fragment of each piece of vegetable which is introduced into the hopper 7 remains in the interior of the composite housing (including the barrel, sleeve or guide member and connecting member) for a predetermined interval of time.

The features of the mincing units C and $C_2$ or $C_1$ and $C_2$ can be embodied in a single mincing unit. Thus, the stator 20 of FIG. 2 can be made shorter and its apertures 27 omitted. The partition 17a then sealingly engages the right-hand end of the thus modified stator. Material issuing from the outlet of the barrel 12 and flowing into the intake 42 can immediately enter the right-hand portions of the cells 23A to be severed prior to passing outwardly through the apertures 28, to be again severed prior to entering the cells 24A by way of the apertures 29, and to be severed for a third time prior to entering the apertures 30 on its way into the outlet 44.

It is also within the purview of the invention to make the rotor integral with the feed screw, i.e., the front end portion or tip of the feed screw may constitute the rotor of the mincing unit. Such rotor may be equipped with removable blades or it may be formed with integral blades.

It is further possible to mount the unit B in such a way that its axis is vertical. For example, if the axis of the feed screw 1 in FIG. 2 is vertical, the housing of the apparatus may comprise a suitable connecting member (similar to the member 3) which conveys material from the outlet at the lower end of the barrel into the intake 42 of the unit C.

Figure 7:
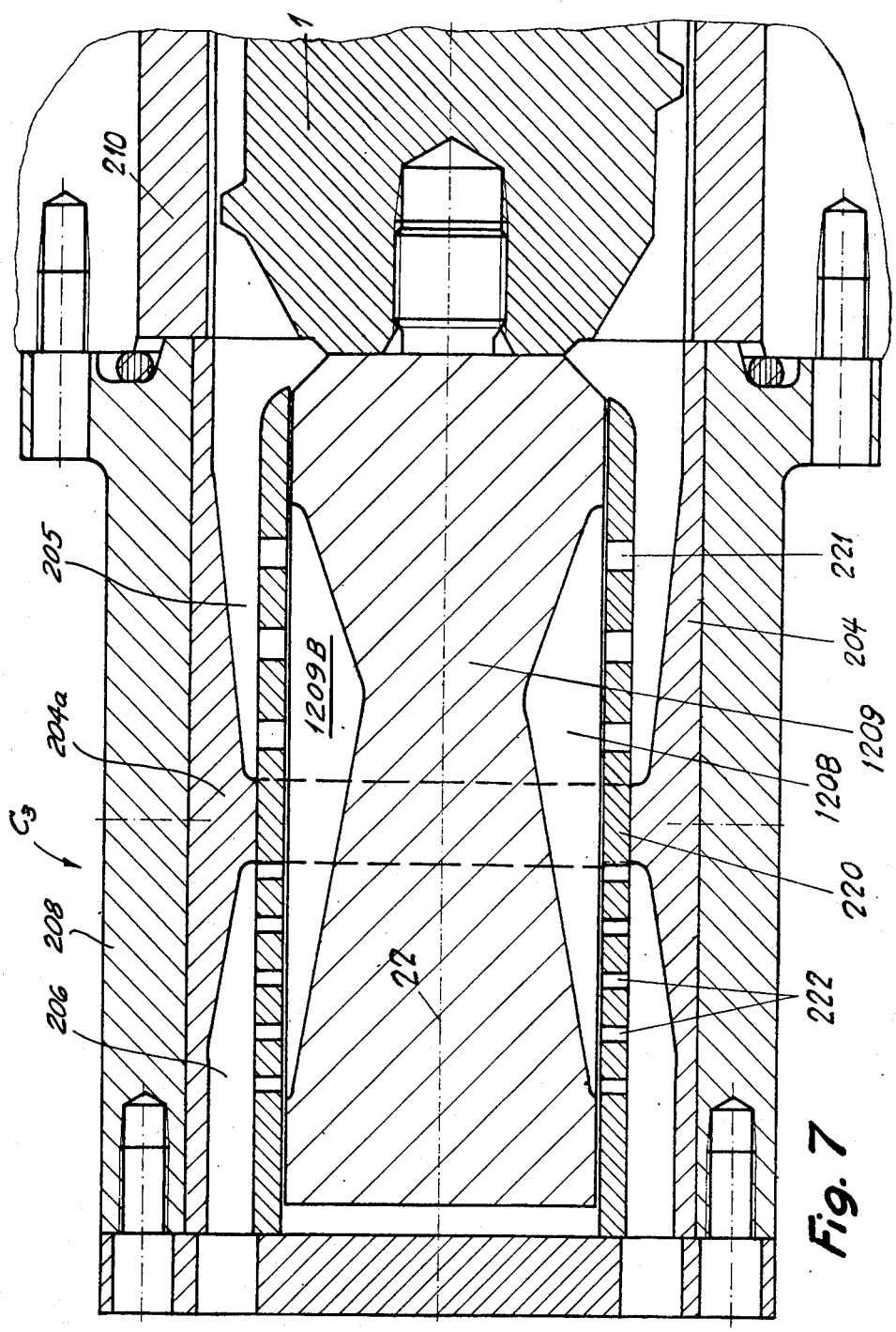
FIG. 7 is a similar longitudinal vertical sectional view of a further communiting unit.

FIG. 7 shows a mincing unit $C_3$ which constitutes a modification of the unit $C_2$. The rotor 1209 has a single ring-shaped recess 1208 and is surrounded by a hollow cylindrical stator 220. The latter has two sets of apertures 221 and 222 which are separated from each other by the ring-shaped internal partition 204a of the guide member 204. The knives 1209B of the rotor sever the material during flow from the intake 205 into the cells of the recess 1208 (while the material is forced to flow through the apertures 221) and again during flow from the cells into the outlet 206 (while the material flows through the apertures 222). The diameters of the apertures 222 are smaller than those of the apertures 221. The knives 1209B may constitute integral parts of the cylindrical body of the rotor 1209.

FIG. 8 shows a mincing unit $C_4$ wherein the cylindrical body of the rotor 160 has a relatively long first recess 172 and a relatively short second recess 173. This body rotates with the feed screw 1 and carries discrete knives 160B. Thus, each of the two recesses 172, 173 is subdivided into an annulus of cells which are open at their outer sides. The cells of the recess 172 register with the apertures 162, 163 and the cells of the recess 173 register with the apertures 164, 165 of a hollow cylindrical stator 161 which surrounds the rotor 160 and is rigid with a holder 240. The annular guide member of the mincing unit $C_4$ has two discrete coaxial sections 167, 168 which are respectively formed with ring-shaped internal partitions 167a, 168a. The partition 167a separates an intake 169 from an intermediate passage 170, and the partitions 168a separates the passage 170 from an outlet 171. The apertures 162, 163 are disposed at the opposite sides of the partition 167a, and the apertures 164, 165 are disposed at the opposite sides of the partition 168a. The apertures 165, 164, 163 are respectively smaller than the apertures 164, 163, 162. The guide member sections 167, 168 are installed, end-to-end, in a sleeve 166 which extends between the holder 240 and the barrel for the feed screw 1.

FIG. 8 shows that the length AA of the recess 173 is substantially less than the length BB of the recess 172 (as considered in the axial direction of the rotor 160). The partition 167a is disposed substantially or exactly midway between the axial ends of the recess 172. However, the partition 168a is nearer to the left-hand than to the right hand axial end of the recess 173 so that the smallest apertures 165 occupy a relatively short portion $a$ and the next-larger apertures 164 occupy a longer portion $b$ of the stator 161.

Figure 4:
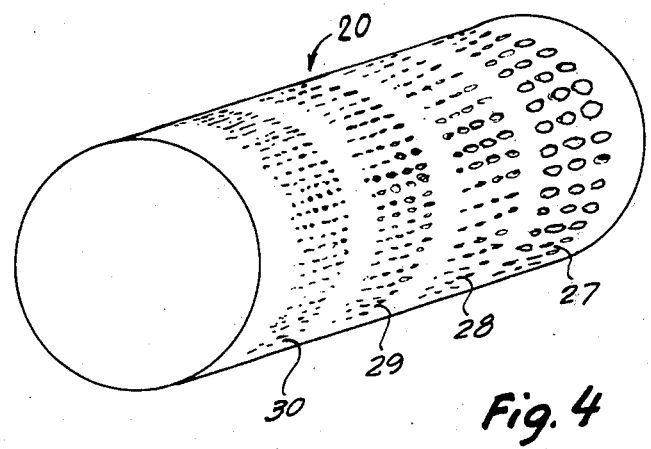
FIG. 4 is a perspective view of the main portion of a stationary apertured cylindrical stator in the comminuting unit of FIG. 2.

In each of the mincing units shown in FIGS. 2, and 5-8, the stator is preferably formed with one or more groups of apertures whereby each such set comprises a relatively large number of discrete apertures (see particularly FIG. 4). The exact number of apertures in the stator can be calculated in dependency on desired output of the apparatus and on the nature of material to be treated. Alternatively, the number of apertures in each set of apertures can be determined empirically for two or more widely different types of vegetable foodstuffs, and is thereupon determined by analogy for processing of other foodstuffs. For example, if a specially designed stator has been found to be suited for comminuting of wheat, a similar or identical stator will be used for processing of rye and/or corn/ Analogously, if a stator has been found to be suitable for processing banana peels, it can be used (in identical or somewhat modified form) for processing of string beans or the like.

The reason for resorting to different embodiments of stators in connection with processing of different types of foodstuffs are numerous. For example, certain foodstuffs tend to clog the apertures 162 and/or 163 of FIG. 8 during the initial stage of a mincing operation. This applies particularly for foodstuffs which are readily flowable as soon as they issue from the barrel of the kneading unit, certain other foodstuffs (which require a longer interval of time before they become readily flowable) are likely to pass through the apertures 162, 163 but will clog the smaller apertures 164 and/or 165. In the first instance, the likelihood of clogging the larger apertures 162 and/or 163 is reduced by making the recess 172 longer than the recess 173 so as to provide more room for the apertures 162, 163. In the second instance (whicch is much more frequent that the first instance), the rotor body will be provided with two recesses of identical axial length (as shown in FIG. 2) so as to allow for the machining of large numbers of smaller apertures (such as 29, 30 of FIG. 2). Thus, the likelihood of clogging of smaller apertures is reduced by reducing the ratio of the combined cross-sectional area of smaller passages to combined cross-sectional area of larger passages, and the likelihood of clogging of larger apertures is reduced by increasing such ratio. Since the stator is a hollow cylinder, it allows for a practically unlimited number of various combinations of apertures as regards their size, distribution, configuration and the ratio of apertures in one set to those in the other set or sets. If one finds that a certain material will not pass through the apertures of a relatively short hollow cylindrical stator, the stator is made longer or the recess or recesses in the rotor body are made longer to allow for the provision of larger numbers of apertures having a certain size. This distinguishes the improved mincer from conventional meat grinders or the like wherein feed screw forces material directly against a disk similar to the extruder 4.

All that counts is to select the length, diameter, the number of apertures in and/or other parameters of the stator in such a way that each set of apertures will offer an optimum resistance to the flow of fragmentized or partially comminuted material therethrough. As a rule, maximum resistance to flow will be offered by the last set of apertures if the stator has two or more sets of apertures. As mentioned above, the apertures may but need not extend exactly radially of the stator; at least some of them may be substantially or partially tangential to the stator and/or at least some of them may extend in or counter to the direction of material flow from the interior of the guide means into the interior of the stator or vice versa.

The diameter of the outermost part or component of the mincing unit but need not equal or approximate the diameter of the feed screw in the unit B. As shown in the drawing, the outer diameter of the stator may equal or approximate the diameter of the core of the feed screw. Since the diameter of the core is preferably larger (e.g., 250 millimeters), the just mentioned selection of the outer diameter of the stator insures that the latter can be formed with a large number of apertures which may be grouped into one, two or more sets. Still further, such dimensioning of the stator facilitates the transport of kneaded material into the mincing unit.

Additional homogenization of the material can be achieved (or such homogenization further influenced) by subdivision of the intake, intermediate passage and/or outlet between the stator and guide member into two or more discrete compartments. For example, and referring to FIG. 2, the intake 42, the passage 43, and/or the outlet 44 can be subdivided into two or more arcuate compartments which are separated from each other by axially extending partitions.

1. A method of continuously processing soft and moist vegetable foodstuffs, particularly vegetables having a high moisture content, comprising the steps of subjecting the moist vegetables to a pronounced compressing, kneading and attendant first homogenizing action to form a mass of fragmentized vegetables; subsequently comminuting said mass including subdividing said mass into a plurality of smaller batches and severing the batches to form a plurality of fragments while homogenizing the fragmentized material by reforming the same into a continuous mass; and subsequently dividing the reformed continuous mass into discrete crumbs.

2. A method as defined in claim 1, wherein said smaller batches are strands.

3. A method as defined in claim 1, wherein said vegetables are grains of corn, and further comprising the step of drying said crumbs and comminuting the thus dried crumbs to form a flowable pulverulent or granular product.

4. A method of making tortilla flour as defined in claim 3, further comprising the steps of cooking dried grains of corn in the presence of lime and water, rinsing the thus cooked grains whereby the thus rinsed grains constitute said moist vegetables which are thereupon subjected to said compressing, kneading and first homogenizing action.

5. A method as defined in claim 1, further comprising the step of sealing said moist vegetables, said mass, said batches and said crumbs from the surrounding atmosphere.

6. A method as defined in claim 1, wherein said steps of kneading, comminuting while homogenizing, and dividing immediately follow each other and are carried out in a common housing in which the material is, up to the dividing step, continuously maintained under pressure.

7. A method as defined in claim 2, wherein said subdividing step comprises the step of conveying the mass under pressure through a first set of apertures and at least a second set of apertures having a smaller size than said first set whereby the mass is divided into a plurality of said strands during passing through each set of apertures, said homogenizing step being carried out during the severing of said strands and during conveying the material from said first to said second set of apertures.

8. A method as defined in claim 1, wherein said compressing step is effected by a rotary feed screw and the pressure supplied by such feed screw is sufficient to maintain said moist vegetables, said mass and said batches in motion in the course of all of said steps.

9. A method as defined in claim 1, wherein the moisture content of vegetables prior to said first mentioned step is between 20 and 60 percent.

10. A method as defined in claim 9, wherein said moisture content is between 35 and 55 percent.

11. A method as defined in claim 1, further comprising the step of cooking said vegetables in the presence of water prior to said kneading step, and wherein said kneading, comminuting, homogenizing and dividing steps are carried out while the vegetables and portions thereof are still hot and contain at least some of said water.

12. A method as defined in claim 1, wherein said comminuting step comprises repeatedly subdividing said mass into batches and said severing of said batches being performed prior and/or subsequent to each subdivision thereof.

13. A method as defined in claim 12, further comprising the step of homogenizing the material subsequent to each of said severing steps.

14. A method as defined in claim 1, wherein said comminuting step comprises cutting the vegetables into fragments having maximum dimensions in the range of 1-2 millimeters.

15. A method as defined in claim 1, wherein said first mentioned step comprises conveying moist vegetables in at least one helical path between the external threads of a rotary feed screw and the internal surface of a cylindrical barrel for the feed screw.

16. A method as defined in claim 15, wherein the width of said path is between 3 and 13 millimeters and said path takes up up to 30 percent of the interior of said barrel.

17. A method as defined in claim 1, wherein said dividing step comprises passing said material through the holes of an extruder to form individual strands and subdividing said strands into said crumbs.

18. A method as defined in claim 1, further comprising the steps of drying and thereupon grinding said crumbs.

19. A method as defined in claim 18, wherein said drying step comprises several successive stages.

20. A method as defined in claim 19, wherein one of said stages includes agitating said crumbs.

21. A method as defined in claim 1, further comprising the step of reducing the speed of material immediately preceding said dividing step.

22. A method as defined in claim 1, wherein said subdividing step comprises conveying said mass through at least one set of apertures and said dividing step comprises conveying homogenized material through a set of holes, the speed at which said mass is conveyed through said apertures being at least four times the speed at which the material passes through said holes.

* * * * *